(12) United States Patent
Tzuang et al.

(10) Patent No.: US 9,691,509 B1
(45) Date of Patent: Jun. 27, 2017

(54) TERAHERTZ-GIGAHERTZ SYSTEM HOUSING CAPABLE OF MINIMIZING INTERFERENCE AND NOISE

(71) Applicant: Archit Lens Technology Inc., Hsinchu (TW)

(72) Inventors: Lawrence Dah-Ching Tzuang, Goleta, CA (US); Yen-Ju Wu, Sheffield (GB)

(73) Assignee: ARCHIT LENS TECHNOLOGY INC., Hsinchu (TW)

( * ) Notice: Subject to any disclaimer, the term of this patent is extended or adjusted under 35 U.S.C. 154(b) by 0 days.

(21) Appl. No.: 15/220,966

(22) Filed: Jul. 27, 2016

(51) Int. Cl.
  *H01Q 17/00* (2006.01)
  *G01J 5/06* (2006.01)
  *G21F 1/10* (2006.01)

(52) U.S. Cl.
  CPC .................................. *G21F 1/10* (2013.01)

(58) Field of Classification Search
  USPC ........ 250/515.1, 505.1, 517.1, 526; 428/343, 428/357, 358, 543; 342/1, 4
  See application file for complete search history.

(56) References Cited

U.S. PATENT DOCUMENTS

| | | | | |
|---|---|---|---|---|
| 3,495,265 A * | 2/1970 | Smith | ..................... | H01Q 15/02 342/1 |
| 4,651,160 A * | 3/1987 | Bornkast | ................... | H01Q 1/42 342/4 |
| 4,658,142 A * | 4/1987 | Johnson | .................... | G01T 7/02 250/336.1 |
| 4,707,606 A * | 11/1987 | Keller | .................. | H01J 47/002 250/374 |
| 4,942,402 A | 7/1990 | Prewer et al. | | |
| 5,208,299 A | 5/1993 | Bales et al. | | |
| 5,208,599 A * | 5/1993 | Rudduck | .............. | G01R 29/105 342/1 |
| 5,381,149 A * | 1/1995 | Dougherty | ............... | G21K 1/10 252/583 |
| 5,488,371 A * | 1/1996 | Targove | ................. | H01Q 17/00 342/1 |
| 6,674,609 B2 | 1/2004 | Boutaghou | | |
| 7,692,147 B2 * | 4/2010 | Hu | ..................... | G01N 21/3151 250/336.1 |
| 7,940,204 B1 | 5/2011 | Winebrand et al. | | |
| 8,450,690 B2 * | 5/2013 | Averitt | ...................... | G01J 3/42 250/341.1 |

(Continued)

*Primary Examiner* — Bernard Souw
(74) *Attorney, Agent, or Firm* — WPAT, PC

(57) ABSTRACT

A THz system has a housing configured to minimize both external noise and internal stray THz waves. The housing material is selected according to the frequency range of THz waves to be propagated though the space enclosed by the housing. In general, the housing is made of foam material, such as low relative dielectric constant foam material, especially foam with conductive additives. The relative dielectric constant of foam material is usually approach to 1.0, which may minimize the reflection of THz waves propagating into the housing. The conductive additives may increase the absorption of the THz waves, even other electromagnetic waves, inside the housing. Clearly, by using proper material, such as Expanded Polypropylene (EPP) and/or Styrofoam, with proper conductive additives, such as graphite, carbon, sliver, absorptive particles/dyes, the housing may minimize the interference of undesired stray terahertz-gigahertz waves, even other noise.

32 Claims, 4 Drawing Sheets

(56) References Cited

U.S. PATENT DOCUMENTS

| | | | | |
|---|---|---|---|---|
| 9,612,357 B1* | 4/2017 | Tzuang | ............... | G01V 8/005 |
| 2008/0156991 A1* | 7/2008 | Hu | ............... | G01N 21/3151 |
| | | | | 250/341.1 |
| 2012/0049090 A1* | 3/2012 | Zhang | ............... | G02B 1/118 |
| | | | | 250/492.1 |
| 2012/0261575 A1* | 10/2012 | Averitt | ............... | G01J 3/42 |
| | | | | 250/332 |

* cited by examiner

| General Concept | The real part and the absolute value of the imaginary part of relative dielectric constant is about 1.0 and large enough to induce high absorption, respectively. |
|---|---|
| General Compositions | Foam material, especially foam material with conductive additives. |
| Exemplary Composition | The mixture of Expanded Polypropylene and carbon particles; The mixture of Expanded Polypropylene and graphite particles; The mixture of Styrofoam and carbon particles; The mixture of Styrofoam and graphite particles. |

FIG.4

TERAHERTZ-GIGAHERTZ SYSTEM HOUSING CAPABLE OF MINIMIZING INTERFERENCE AND NOISE

FIELD OF THE INVENTION

The present invention relates to a terahertz-gigahertz system (THz system) housing capable of minimizing at least the interference of undesired stray terahertz-gigahertz waves. In particular, the present invention describes a terahertz-gigahertz system housing made of foam material with conductive additives, wherein the foam materials may be the widely used Expanded Polypropylene (EPP) and the widely used Styrofoam, wherein the conductive additives may be the widely used graphite particles and carbon particles.

BACKGROUND OF THE INVENTION

Terahertz-gigahertz waves have been used in some applications during the past years. For example, it has been used in security screening tools because of its unique transmission properties that identifies concealed objects, such as a metal weapon hidden under the fiber clothing. The terahertz-gigahertz system requires housing to hold and/or connect the part(s) of the THz system. The development of high performance Terahertz-Gigahertz (THz) systems, such as THz image systems and THz communication systems, relies upon that both external electromagnetic (EM) noise and internal stray Terahertz-Gigahertz waves are negligible. These considerations are crucial because the wavelength of the THz waves (a few mm) is comparable to the dimensions of elements of the THz system itself. Therefore, a suitable THz system's housing that can effectively reduce reflection from the system interior and absorb EM waves from the exterior at the same time is critical.

Till now, some well-known skills use the non-smooth surface to reduce the reflection of incident EM waves. Just for examples, a non-smooth surface having many pin-like or wedge-like structures whose geometrical configurations may significantly modify the propagation of the incident EM waves. Some other well-known skills use specific material(s) to reduce reflection and enhance absorption of the incident EM waves, even other EM noise. Just for example, electrically insulating and silicone-based elastomer which comprises room temperature polymerizing aromatic/aliphatic hydrocarbon substituted polysiloxane with an inert, electrically insulating, powdered siliceous filler and a curing agent. Just for reference, U.S. Pat. No. 7,940,204, U.S. Pat. No. 6,674,609, U.S. Pat. No. 5,208,299 and U.S. Pat. No. 4,942,402 are some of these well-known skills. However, all these well-known skills are not preferable to form a scalable (in terms of its size and its structural complexity), lightweight, compact, robust, and inexpensive THz system's housing capable of minimizing at least the interference of undesired stray terahertz-gigahertz waves.

Therefore, there is a need to provide a housing for the terahertz-gigahertz system to minimize both the external noise and internal stray EM waves for THz system application such as imaging, communicating or future-developed applications.

SUMMARY OF THE INVENTION

The present invention proposes a terahertz-gigahertz system housing to minimize noise and internal interference. The present invention achieves such housing by using specific material(s) to form the housing with the desired electromagnetic properties such that the housing may effectively absorb as much THz wave as possible in all directions while minimizing internal reflection.

Some embodiments are related to a Terahertz-Gigahertz system housing by introducing absorptive particles/dyes, such as conductive carbon and conductive graphite, into a foam material, which have low relative dielectric constant (close to 1.0). The conductive particles/dyes with high absorption absorb stray EM waves entering from either the exterior or interior of the housing, especially stray THz waves, which penetrate into the housing through some finite amount of distance. In addition, the low relative dielectric constant of the used foam material prevents harmful Fresnel reflection at the interior of the housing that causes unwanted stray EM waves, especially stray THz waves.

The proposed THz system housing is advantageous over other aforementioned well-known skills in some ways. First, the absorptive particles/dyes may be introduced into the material either prior or after the formation of the housing, which means the size, the shape, and the formation of the housing are not limited by the usage of the absorptive particles/dyes. Further, the percentage of the introduced absorptive dyes/particles may be precisely and flexibly controlled to adjust the housing properties. Additionally, because the absorptive particles/dyes are integrated in the housing, both the external anti-reflection and absorption layers/structures which may complicate the housing are not required.

BRIEF DESCRIPTION OF THE DRAWINGS

FIG. 4 lists the general concept, the general composition, and some exemplary compositions of the housing material(s) proposed by the invention.

DETAILED DESCRIPTION OF THE INVENTION

Reference will now be made in details to specific embodiment of the present invention. Examples of these embodiments are illustrated in the accompanying drawings. While the invention will be described in conjunction with these specific embodiments, it will be understood that the intent is not to limit the invention to these embodiments. In fact, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without at least one of these specific details. In other instances, the well-known portions are less or not described in detail in order not to obscure the present invention.

Figure 1A:
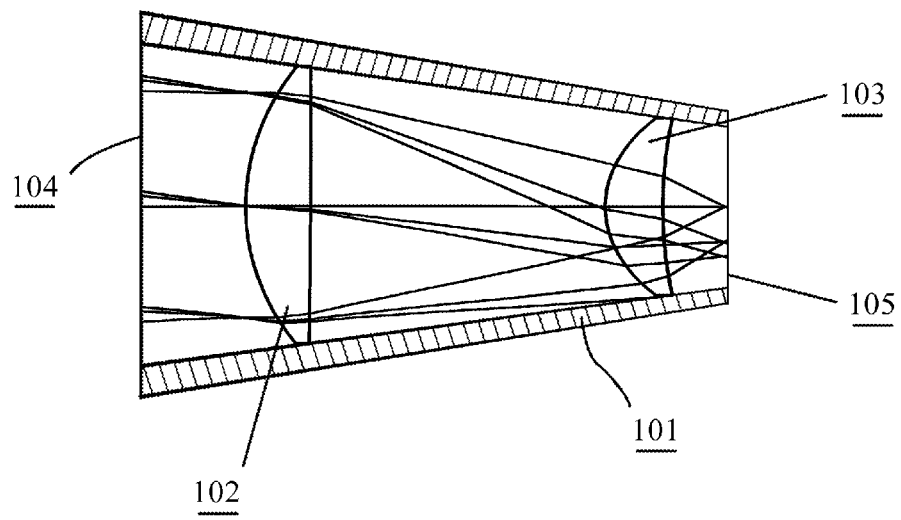
FIG. 1A to FIG. 1B are two exemplary THz housing system.
Figure 1B:
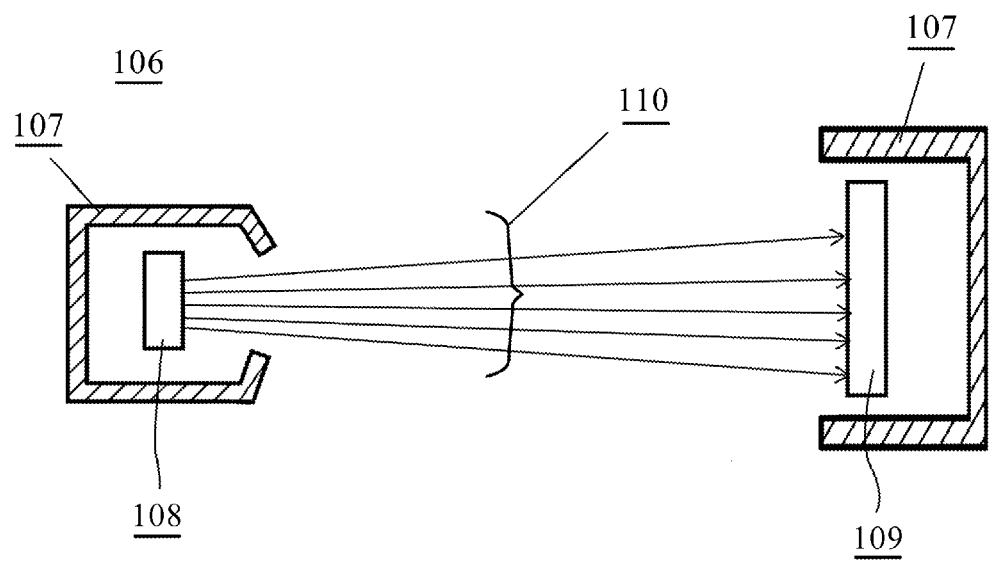

Terahertz-gigahertz systems (THz system) in general require a specific housing designed to hold and/or connect their element(s). In general, the housing encloses a space and has at least one opening connecting the enclosed space and the exterior space, where different openings are separated from each other. For example, as shown in FIG. 1A, a THz image system 100 may have a cylindrical housing 101 and two lens 102/103 positioned separately inside the cylindrical housing 101. Hence, the THz waves 110 may be reflected off or transmitted through an object positioned on the left side of the cylindrical housing 101 then propagated through the left opening 104, the lens 102 and the right opening 105 in sequence to the image sensor 1002 positioned on the right side of the cylindrical housing 101, which means a THz image is formed by the THz waves 110 reflected off or transmitted through the object may be formed on the right side of the cylindrical housing 101. In another example, as shown in FIG. 1B, a THz communication system 106 may have two separated housings 107 which enclose an emitter 108 and a receiver 109 respectively. Hence, the operation of the emitter 108 and the receiver 109 may be protected from the interference and noise by the two housings 107 respectively, and the THz waves 110 emitted by the emitter 108 may propagate through the space between the two housing 107 and then into the receiver 109.

The present invention greatly reduces both external and internal THz noise. More specifically, the present invention forms the housing by using the material(s) capable of reflecting almost none of the incident THz waves (even other EM waves) and absorbing almost all of the incident EM waves (including THz waves).

The invention achieves the aforementioned desired properties by using at least one material which has a real part of the relative dielectric constant at about 1.0 and a non-negligible imaginary part of the relative dielectric constant. In this way, the Fresnel reflection at the housing surface is greatly reduced. In other words, the reflection of the THz waves (or other EM waves) incident to the housing may be negligible, but the absorption of the THz waves (and other EM waves) is significant. Therefore, the housing may effectively absorb the THz waves (and other EM waves) with minimal reflection, so that the THz waves propagating in the housing interior is not affected by external or internal noise.

The absorption in the housing sidewall is a function of both the absolute value of the imaginary part of the relative dielectric constant of the housing material and the thickness of the housing sidewall, where the former defines the absorption rate and the latter determines the accumulative absorption. Therefore, to achieve the same attenuation amount, the higher the absolute value of imaginary elements of the relative dielectric constant, the less the required housing thickness. The reverse is also true. Just for example, an exemplary standard is that 30 dB attenuation may be achieved when the EM waves (or THz waves) propagate through a housing sidewall with thickness of several centimeters.

Some embodiments achieves the aforementioned desired properties of the THz system housing by using foam materials because of its relatively low relative dielectric constant. One benefit of the usage of the foam material is that there are many kinds of commercial foam material having low relative dielectric constant close to about 1.0. Just for example, both the Expanded Polypropylene (EPP) and Styrofoam are two commercial materials having lower relative dielectric constant, and some special kinds of EPP and some special kinds of Styrofoam have relative dielectric constant about 1.0. Particularly, the invention only requires the low relative dielectric constant feature but not limits what kind of the foam material is used. Any existed, on-developed and to be appeared foam material may be used by the invention.

Some embodiments achieves the aforementioned desired properties of the THz system housing by using the foam material doped with conductive additives, where the details of the foam material are equal to those discussed above. The benefit of the usage of the conductive additives is that these conductive additives may increase the absorption of the THz waves and/or other EM waves. Just for example, the conductive additives may be made of graphite or carbon, even may be made of sliver or other conductive material(s). Also just for example, the conductive additives may be the absorptive particles or the absorptive dyes, especially, the absorptive dyes and the absorptive particles have higher dielectric loss. Of course, not only both the size and the shape of the conductive additives are adjustable, also the ratio between the conductive additives and the foam material is adjustable to fine tune its absorption/reflection properties. Moreover, as discussed above, the adsorption coefficient and the thickness of the housing are dependent to each other, and the introduced amount of the conductive additives has a flexible range.

Figure 2:
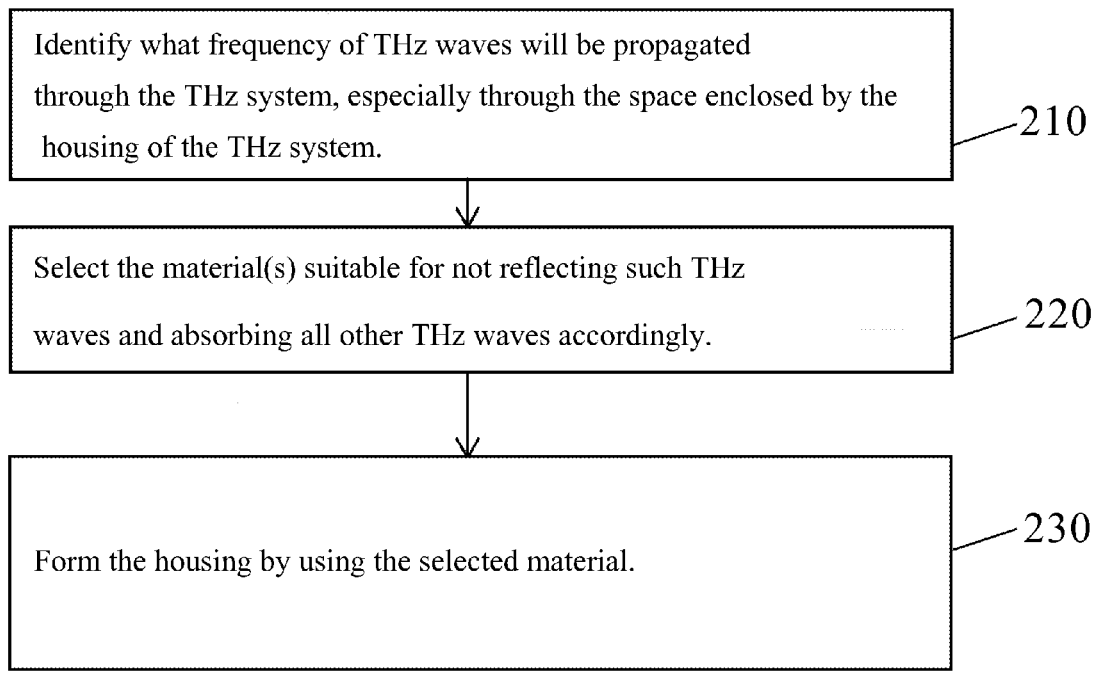
FIG. 2 is a flowchart about the basic steps to implement the proposed invention.

In practice, the proposed invention is also related to the method of minimizing both the interference and the noise of a THz system housing, the method of minimizing both the noise and the interference of undesired stray of a THZ wave of a THz system housing, or other method(s) of the similar application(s). As shown in FIG. 2, each of these methods includes the following basic steps. First, as shown in block 210, identify the frequency range of the THz waves that the THz system housing is designed correspondingly. Then, as shown in block 220, select at least one material that is capable of effectively absorbing the THz waves with less reflections of the THz waves. Finally, as shown in block 230, form the THz system housing by using the selected material. The selection is essentially based on the electromagnetic property of the selected material(s). It should be able to fully absorb the THz waves and other EM waves from the outside environment, to absorb the noise generated inside the material, and to have lower relative dielectric constant for reducing reflection. Of course, whenever more than one kind of material is qualified, it is popular to form the THz system housing by using one only kind of the qualified materials, although it is also acceptable to form the THz system housing by using the mixture of at least two kinds of the qualified materials.

Besides, although not necessary but beneficial, it is better that the selected material(s) possesses both higher mechanical strength and higher chemical stability. The higher mechanical strength allows the housing to hold and protect element(s) in the housing interior, and to have a solid structure with smaller deformation after the impact. Just for example, the elements may be the lens(es) and/or the sensors of the THz image system, also may be the emitter and/or the receiver of the THz communication system. The higher chemical stability allows the housing to be used in the more extreme environments. Just for example, the environmental variations include at least temperature, humidity, and others. In addition, when the housing material is a mixture of the foam material and the conductive particles/dyes, whether the conductive particles/dyes may be simply and uniformly introduced into the foam material is also a factor of the selection of the material(s) for forming THz system housing.

Figure 3:
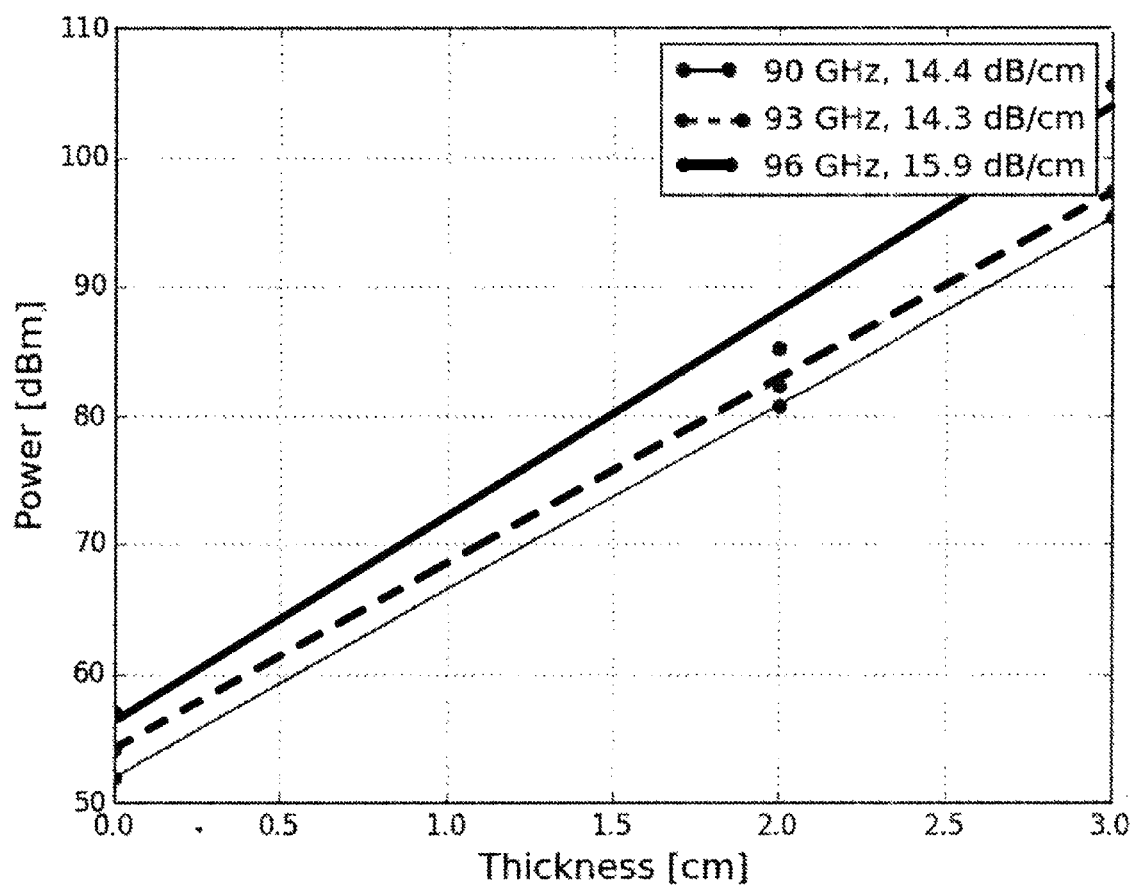
FIG. 3 illustrates the performance through test results of one exemplary material of the proposed invention.

One example of the present invention is a housing material which may effectively absorb at least the THz waves on the frequency range about from 90 to 96 GHz. This exemplary material is a conductive EPP which is the mixture of the EPP and the carbon particles, wherein the weight percentage of the carbon particles is about 13%~15%. FIG. 3 illustrates the performance testing result of such exemplary material. As shown in FIG. 3, the absorption strength of such exemplary material is about 15 dB/cm for the three different frequencies: 90 GHz, 93 GHz and 96 GHz. Obviously, by using the exemplary material, the thickness of the housing may be reduced to only 3~4 centimeters for about 50 dB attenuation. Of course, higher thickness of the housing is also acceptable to enhance the mechanical strength. Moreover, although not yet particularly illustrated herein, other experiments/simulations show that the mixture of the foam material (especially Expanded Polypropylene and Styrofoam) and the conductive particles (especially carbon particles and graphite particles) also may have essentially similar absorption strength over a large frequency range, such as 80~300 GHz, 100~500 GHz and 300~550 GHz. These non-illustrated experiments/simulations also show that the weight percentage of the carbon particles also may be about from 0.1% to 3%, about from 1% to 5%, about from 3% to 9%, about from 7% to 13% or about from 10% to 15%. Indeed, the acceptable weight percentage of the absorptive dyes/particles is a function of some parameters, such as the density of the foam material, the relative dielectric constant of the foam material, and the thickness of the foam material, even the frequency range of the THz waves that a THz housing is designed for. Just for example, the higher the weight percentage of the carbon particles, the more the absorption of the THz waves (even other EM noise). And then, for achieving the same amount of attenuation, the required thickness of the housing is reduced.

Furthermore, to further minimize the harmful Fresnel reflection at the interior sidewall of the housing, one more option of the present invention is that the interior sidewall of the housing may have no exposed elements that may introduce extra internal noise through scattering and reflection off sharp corners or high reflection surfaces. The interior sidewalls of the housing may also be either smooth or textured, and the only limitation is that the geometrical configuration of the interior sidewall will not cause extra internal noise through the interaction between the propagated THz waves and the interior sidewall. In addition, the details of the elements, such as pipelines and joints, are dependent on the details of the THz system, but the invention is nothing about such details. Note that the density of the foam material, such as EPP, is also adjustable. In general, the higher the density of the foam material, the less the air filled inside the foam material and then the higher the reflectivity and weight of the foam material. Hence, for some foam materials having higher density, the reflection of the THz waves may be increased. In such situation, a textured (or viewed as rough) interior sidewall of the THz system housing may increase the effective number of bounces (or viewed as the probability of multiple reflections) of the THz waves at the material interface, then causing both an increase in the absorption and a reduction in THz reflection simultaneously. Again, this also means that both the internal or external noise and interference may be reduced.

Furthermore, although the above discussions are focused on the materials which may be used to form the Thz system housing to minimize the interference and the noise, the required electro-magnetic properties of such materials in order to minimize interference and noise are independent on the geometrical features of the THz system housing. In other words, the shape, size, and positioning of the present THz system housing are not limited in this invention. Therefore, in addition to the situation discussed above that the housing encloses a space where the THz waves may be propagated through, in other situations not particularly discussed hereabove, the present THz system housing also may be positioned in proximity to (but not enclosing) the THz waves, or even may be integrated with any element in the THz system. Hence, no matter how the THz system housing is configured, by using the materials discussed above to form the THz system housing, both the noise and the interference of a THZ wave may be minimized. Just for example, the contour of the THz system housing may be a hollow shell with opening(s), a cylindrical shell with opening(s), a polygon shell with opening(s), a columnar shell with opening(s), a curved surface with opening(s), a planer surface without opening, and other contours with/without opening(s).

As a short summary, the present invention propose a THz system housing with particular material(s) being able to at least absorb the stray THz waves and to minimize reflection of the stray THz waves simultaneously. As shown in FIG. 4, the general concept of the proposed material(s) is that the real part and the absolute value of the imaginary part of relative dielectric constant is about 1.0 and large enough to induce high absorption, respectively; the general composition of the proposed material(s) is foam material, especially foam material with conductive additives; and some exemplary compositions of the proposed material(s) is the mixture of Expanded Polypropylene and carbon particles, the mixture of Expanded Polypropylene and graphite particles, the mixture of Styrofoam and carbon particles, and the mixture of Styrofoam and graphite particles.

Variations of the methods, the devices, the systems and the applications as described above may be realized by one skilled in the art. Although the methods, the devices, the systems, and the applications have been described relative to specific embodiments thereof, the invention is not so limited. Many variations in the embodiments described and/or illustrated may be made by those skilled in the art. Accordingly, it will be understood that the present invention is not to be limited to the embodiments disclosed herein, can include practices other than specifically described, and is to be interpreted as broadly as allowed under the law.

What is claimed is:

1. A THz system housing which is made of a material capable of minimizing both the noise and the interference of undesired stray THZ wave propagating adjacent to the THz system housing.

2. The THz system housing of claim 1, wherein the THz housing encloses a space and has at least one opening connected to the enclosed space, wherein the THz waves may enter or exit the enclosed space via the opening(s).

3. The THz system housing of claim 1, wherein the frequency of the THz wave is about 80~550 GHz.

4. The THz system housing of claim 1, wherein both the thickness and the material of the housing are chosen to achieve at least 30 dB attenuation when the THz waves penetrate though the housing.

5. The THz system housing of claim 1, wherein the housing is made of the materials whose the real part and the absolute value of the imaginary part of relative dielectric constant is about 1.0 and large enough to induce high absorption, respectively.

6. The THz system housing of claim 1, wherein the material of the housing is foam material.

7. The THz system housing of claim 6, wherein the material of the housing is low relative dielectric constant foam material.

8. The THz system housing of claim 1, wherein the material of the housing is foam material with conductive additives.

9. The THz system housing of claim 8, wherein the material of the foam material is chosen from a group consisting of Expanded Polypropylene (EPP) and Styrofoam.

10. The THz system housing of claim 8, wherein the conductive additives is chosen from a group consisting of graphite, carbon, sliver, absorptive particles and absorptive dyes.

11. The THz system housing of claim 10, wherein both the absorptive dyes and the absorptive particles have high dielectric loss.

12. The THz system housing of claim 6, wherein the material of the housing is conductive EPP.

13. The THz system housing of claim 12, wherein the conductive EPP is a mixture of EPP and carbon particles, wherein the weight percentage of the carbon particles is about 13%~15%.

14. The THz system housing of claim 12, wherein the conductive EPP is a mixture of EPP and carbon particles, wherein the weight percentage of the carbon particles is chosen from a group comprising about 0.1%~3%, about 1%~5%, about 3%~9%, about 7%~13% and about 10%~15%.

15. The THz system housing of claim 1, wherein the housing is made of materials with lower relative dielectric constant at 80-550 GHz.

16. The THz system housing of claim 1, wherein the interior sidewalls of the housing may be either smoothed or textured.

17. The THz system housing of claim 15, wherein the interior sidewall has no exposed elements that causes extra internal noise through scattering/reflections.

18. The THz system housing of claim 1, wherein the housing have two separated opening and the THz waves may be propagated through one opening, the enclosed space and another opening in sequence.

19. A method of minimizing the interference and noise of a THz system housing, comprising:
identifying the frequency range of the THz wave(s) that the THz system housing is designed correspondingly;
selecting at least one material capable of effectively absorbing the THz waves with less reflections of the THz waves; and
forming the THz system housing by using the selected material.

20. The method of claim 19, wherein the frequency of the THz wave is about 80~550 GHz.

21. The method of claim 19, further comprising forming the THz system housing by using a material whose relative dielectric constant has a real part and an image part, wherein the real part is about 1.0 and the image part has an absolute value large enough to induce less reflection and high absorption of the THz wave.

22. The method of claim 19, further comprising choosing the thickness and the material of the housing to achieve at least 30 dB attenuation when the THz waves penetrate though the shielding.

23. The method of claim 19, further comprising forming the THz system housing by using foam material, such as the low relative dielectric constant foam material.

24. The method of claim 19, further comprising forming the THz system housing by using foam material with conductive additives.

25. The method of claim 24, wherein the material of the foam material is chosen from a group consisting of Expanded Polypropylene (EPP) and Styrofoam.

26. The method of claim 24, wherein the conductive additives is chosen from a group consisting of graphite, carbon, sliver, absorptive particles and absorptive dyes.

27. The method of claim 26, wherein both the absorptive dyes and the absorptive particles have high dielectric loss.

28. The method of claim 19, further comprising forming the THz system housing by using conductive EPP.

29. The method of claim 28, wherein the conductive EPP is the mixture of EPP and carbon particles, wherein the weight percentage of the carbon particles is about 13%~15%.

30. The method of claim 28, wherein the conductive EPP is a mixture of EPP and carbon particles, wherein the weight percentage of the carbon particles is chosen from a group comprising about 0.1%~3%, about 1%~5%, about 3%~9%, about 7%~13% and about 10%~15%.

31. The method of claim 19, further comprising forming the THz system housing by using material having lower relative dielectric constant for the THz waves.

32. The method of claim 19, wherein the THz housing encloses a space and has at least one opening connected to the enclosed space, wherein the THz waves may enter or exit the enclosed space via the opening(s).

* * * * *